June 2, 1936. P. E. HAWKINSON 2,043,169
TIRE SPREADER AND RIM REMOVER
Filed Nov. 14, 1935 2 Sheets-Sheet 1
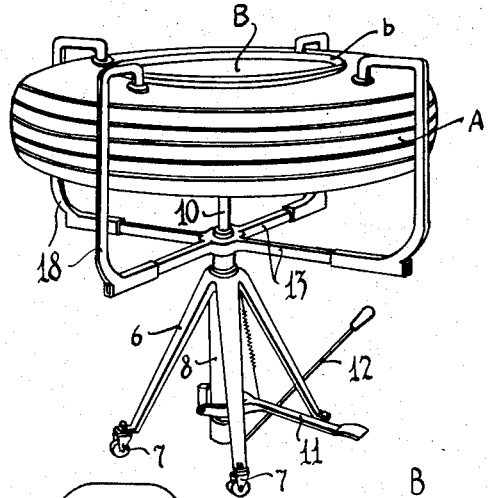
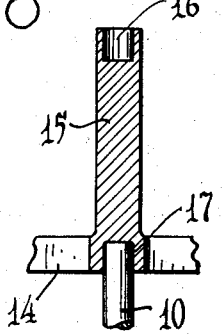
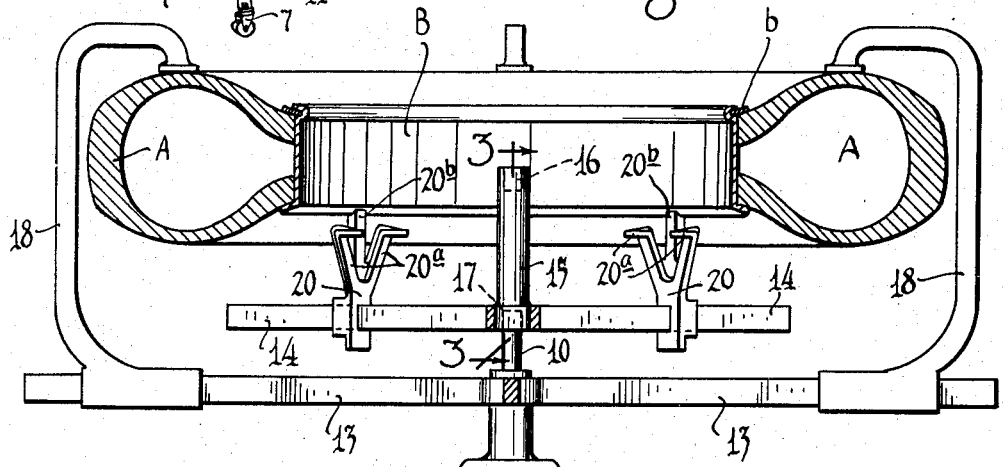
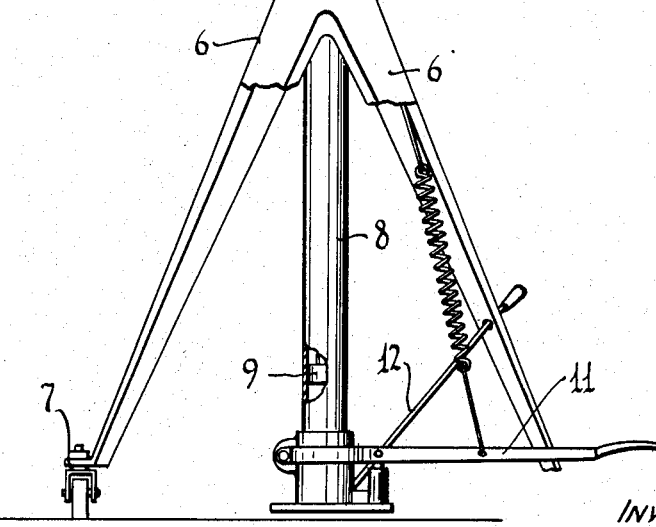
INVENTOR
Paul E. Hawkinson
BY HIS ATTORNEYS

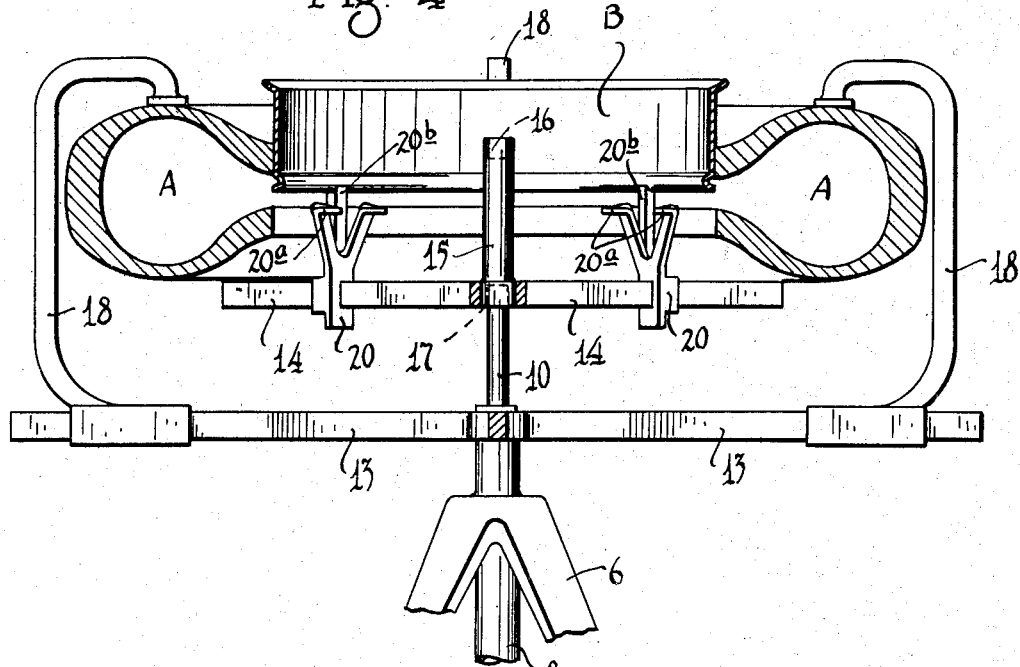
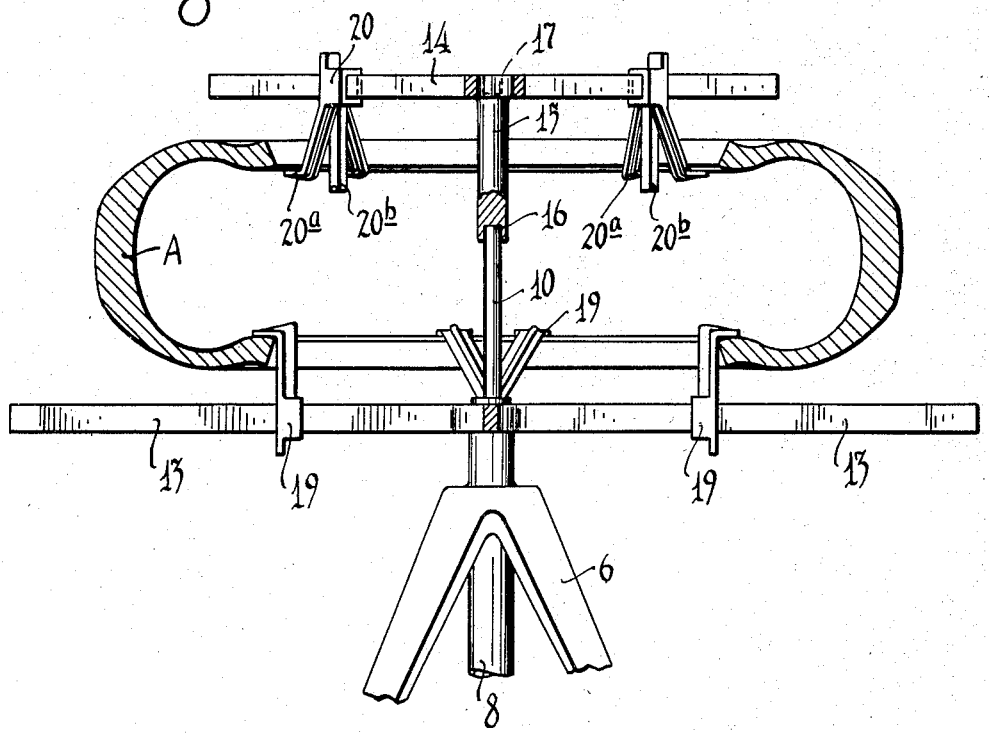

Patented June 2, 1936

2,043,169

UNITED STATES PATENT OFFICE 2,043,169

TIRE SPREADER AND RIM REMOVER

Paul E. Hawkinson, Minneapolis, Minn., assignor to Paul E. Hawkinson Company, Minneapolis, Minn., a corporation of Minnesota Application November 14, 1935, Serial No. 49,750

5 Claims. (Cl. 157—6)

My present invention has for its object the provision of an extremely simple, highly efficient and low cost apparatus for use in connection with the manipulation of pneumatic tires.

The apparatus is in the nature of a tire spreader and rim remover adapted for use in spreading tires for the purpose of examination, repair, or retreading, and provides means whereby the wheel rims may be readily removed from the tires.

Various complicated and relatively expensive devices have hitherto been provided for performing or assisting in performing the functions above stated, but such expensive devices have not been extensively used in small shops and elsewhere where expense is a highly important item. This apparatus, because of its simplicity and low cost, will be found especially serviceable and saleable in small shops but, nevertheless, is of such extremely useful character that it will be found serviceable in larger plants and, in fact, in substantially all places where the spreading of tires and the removal of rims from the tires or application of the rims to the tires are performed.

A commercial form of the apparatus is illustrated in the accompanying drawings, wherein like characters indicate like parts throughout the several views.

Referring to the drawings:

Fig. 1 is a perspective showing the improved apparatus and a pneumatic tire and wheel rim applied therein;

Fig. 2 is a view partly in vertical axial section and partly in full elevation with some parts broken away showing the apparatus illustrated in Fig. 1;

Fig. 3 is a fragmentary section on the line 3—3 of Fig. 2;

Fig. 4 is a view corresponding to Fig. 2 but with the base portions broken away and with the apparatus in action forcing a wheel rim out of a tire; and Fig. 5 is a view corresponding to Fig. 4 but showing the apparatus adjusted and used to spread a tire.

The supporting base of the apparatus may take various forms but is preferably in the form of a tripod 6, shown as supported on castor wheels 7. The power device of this apparatus is a hydraulically actuated cylinder and piston with suitable controlling valve mechanism. The cylinder 8 is axially disposed and rigidly secured to, being preferably cast integral with the tripod 6. Working within the cylinder 8 is a piston 9, the rod 10 of which is extended upward through the upper end of the cylinder 8 and, as will presently be noted, supports and moves the relatively movable head or element of the apparatus. The valve mechanism for controlling the hydraulic fluid and for operating the hydraulic pump may be that employed in connection with hydraulic jacks such, for example, as the hydraulic jack known to the trade under the trade name of "Blackhawk Jack". For the purpose of this case, it is only desirable by way of illustration to particularly note the spring-retracted pump-actuating treadle lever 11 and the valve-actuating rod 12.

Mounted on a suitable part of the base structure, such as the upper end of the cylinder 8, is a lower head 13 which is preferably of spider-like form and provided with radial arms. This lower head 13 is held against axial or vertical movements but may be and preferably is swivelled on the upper end of the cylinder 8 so that it may be rotated.

Mounted on the upper end of the piston rod 10 is an upper head 14 also preferably of spider-like form being provided with radial arms. This upper head 14, for an important reason hereinafter noted, is provided on one side with a long projecting axial hub or short stub-shaft 15. This hub 15, at its projected end, is provided with a depression 16 affording a seat for the upper end of piston rod 10 when said hub is turned downward; and at the base or bottom of said hub, there is a similar seat or depression 17 adapted to receive the upper end of the piston rod 10 when said hub is turned upward.

In the drawings a pneumatic tire is indicated by the character A; and the wheel rim B is provided with the customary lock-ring b.

For use on the arms of the lower head 13, there is provided relatively long outside hook-lugs 18 and relatively short inside hook-lugs 19. These hook-lugs 18 and 19, at their lower portions, have sleeves adapting them to slide upon and rendering them readily removable from the arms of said lower head. When the hook-lugs 18 are applied, as shown in Figs. 1, 2 and 4, their inturned upper ends will engage the intermediate upper portion of the tire A; and when the hook-lugs 19 are applied, as shown in Fig. 5, their outturned upper ends will engage the interior of the lower beads of the tire.

Mounted for sliding movements on the arms of the upper head 14 and readily removable therefrom are hook-lugs 20 which, as shown, have bifurcated hook ends 20a and centrally located rim-engaging punches 20b. The use of these combined hook and punch lugs for performing the several different functions in cooperation with the lugs 18 and 19 will be made clear by the following illustrations.

For removing a wheel rim from a tire the arrangement of the device, as illustrated in Figs. 1, 2, 3 and 4, is used. In this arrangement the upper head 14 is set in a relatively low position or relatively close to the head 13 with its hub 15 upwardly projected and with the upper end of the piston rod 10 seated in the depression 17 and the lugs 20 are set, as shown in Figs. 2 and 4, with their hook ends 20 turned radially inward and with the punches 20b engaging the lower flange of the wheel rim and with no part of the lug projecting radially outward of the lower flange of said rim. In the removal of the rim from the tire the outside lugs 18 are applied, as shown in Figs. 1, 2 and 3, so as to hold the upper flange or portion of the tire against upward movement.

First the tire and rim are applied, as shown in Fig. 2, with the lock-ring b' upward and then sufficient hydraulic pressure is applied to relieve the pressure of the upper bead on said ring and permit the said lock-ring b to be removed. Then, the tire and rim are reversed, as shown in Fig. 4, and pressure is again applied tending to force the wheel rim out of the tire. If the upper bead tends to stick to the rim as it will frequently do, due to rust or accumulation of dirt, it is an easy matter to loosen the bead from the rim by use of a hammer or the like to thereby assist the upward pressure in forcing the rim out of the tire. Fig. 4 shows the rim partially removed from the tire. In applying the rim in the tire, the apparatus will be adjusted and used as shown in Fig. 2 and the upper beads of the tire will be forced downward so as to permit easy application of the lock-ring b.

For spreading a tire as required for inspection, repair, or retreading, the adjustment of the parts illustrated in Fig. 5 is employed. In this arrangement the upper head 14 is applied with its long hub 15 downwardly extended and seated on the upper end of the piston rod 10. The hook-lugs 19 are then applied on the arms of the lower head 13 with their hook ends outwardly turned into engagement with the lower bead of the tire. The upper hook-lugs 20 are set on the arms of the upper head 14 downwardly turned with their hook ends 20a outwardly projected and engaged under the upper beads of the tire. When this adjustment is effected the hydraulic pressure applied will force the head 14 upward and positively spread the tire. In this adjustment it will be noted that the punches 20b are radially inward and clear the upper bead of the tire so that they do not interfere with the spreading action.

It has now been observed that for the spreading of a tire the upper head 14 is normally set at a much greater distance above the lower head 13 than when set for removal or application of a rim from a tire. The amount of movement, however, required of the piston for performing both functions is substantially the same and this is brought about by the use of the hub or stub-shaft 15 which corresponds in its length substantially to the normal distance between the two heads.

Otherwise stated, in performing both of the above noted functions, the piston of the hydraulic press moves in the cylinder through the same zone of action. Except for this hub extension in the upper head, the piston would be required to move not only the required distance for performing either of the functions, but far enough to correspond to the normal variation in the initial relative positions of the two heads; and to provide for such relatively long movement of the piston in the cylinder, it would require a very long cylinder and piston, would render the device slow in operation, and too expensive for a simple low cost apparatus.

The simplicity and utility of the device is thought to be made obvious from the foregoing description and it will, of course, be understood that various alterations and changes in the details of construction and arrangement of parts may be made within the scope of the invention herein disclosed and claimed.

What I claim is:

1. In a tire manipulating device, a base, a lower head mounted on said base and having radial arms, an upper head axially aligned and cooperatively associated with said lower head and having radial arms, tire-engaging lugs independently and slidably mounted on the arms of said upper and lower heads, and a power device anchored to said base in axial alignment with said upper and lower heads and operative to force the former away from the latter, said upper head being reversible and provided with a long axially projecting hub, said power device including an axially movable piston which in one position of said upper head is engageable directly with said upper head and in the inverted position of the latter is directly engageable with the axially projecting hub thereof.

2. The structure defined in claim 1 in which the lugs on the arms of said upper head are removable therefrom and are reversible and have punch-acting projections for engagement with the tire rim when upwardly projected from said upper head.

3. The structure defined in claim 1 in which the lugs on the arms of said upper head are removable therefrom and are reversible and have punch-acting projections for engagement with the tire rim when upwardly projected from said upper head, the outer lugs on the arms of said lower head being engageable with the top of the tire to hold the tire down while the rim is being raised out of a tire.

4. In a tire manipulating device, a base, a lower head mounted on said base and having radial arms, an upper head axially aligned and cooperatively associated with said lower head and having radial arms, tire-engaging lugs slidably mounted on the arms of said upper and lower heads, said upper head being reversible and provided with a long, axially-projecting hub, and a power device anchored to said base including an axially movable element which in one position of said upper head is engageable directly with said upper head, in the inverted position of said upper head is engageable with the axially-projecting hub thereof.

5. The struture defined in claim 4 in which the lugs on the arms of said upper head are reversible thereon and have hook-like ends for engagement with the beads of the tire casing, in one adjustment of the apparatus, and have rim-engaging punches for engagement with a tire rim, in the other adjustment of the apparatus.

PAUL E. HAWKINSON.